US012782126B2

(12) United States Patent
Bergeron

(10) Patent No.: US 12,782,126 B2
(45) Date of Patent: Nov. 3, 2026

(54) SYSTEM AND METHOD FOR GEOREFERENCING OF MARKERS USING AERIAL VEHICLE AND USE OF THE GEOREFERENCED POSITION OF THE MARKERS FOR DETECTING POTENTIAL MOVEMENT OF THE GROUND AND/OR OVERGROWTH OF VEGETATION

(71) Applicant: LES SYSTEMES FLYSCAN INC., Québec (CA)

(72) Inventor: Eric Bergeron, Québec (CA)

(73) Assignee: LES SYSTEMES FLYSCAN INC., Québec (CA)

( * ) Notice: Subject to any disclaimer, the term of this patent is extended or adjusted under 35 U.S.C. 154(b) by 0 days.

(21) Appl. No.: 19/102,582

(22) PCT Filed: Aug. 11, 2023

(86) PCT No.: PCT/CA2023/051073
§ 371 (c)(1),
(2) Date: Feb. 10, 2025

(87) PCT Pub. No.: WO2024/031197
PCT Pub. Date: Feb. 15, 2024

(65) Prior Publication Data
US 2026/0043649 A1 Feb. 12, 2026

Related U.S. Application Data

(60) Provisional application No. 63/371,162, filed on Aug. 11, 2022.

(51) Int. Cl.
*G01C 11/02* (2006.01)
*G01C 15/00* (2006.01)
*G06V 20/17* (2022.01)

(52) U.S. Cl.
CPC ............ *G01C 11/02* (2013.01); *G01C 15/006* (2013.01); *G06V 20/17* (2022.01)

(58) Field of Classification Search
CPC ........ G06V 20/17; G06V 20/64; G01C 11/02; G01C 15/006; G01C 15/00
(Continued)

(56) References Cited

U.S. PATENT DOCUMENTS 6,243,483 B1 6/2001 Petrou et al.
7,184,072 B1 2/2007 Loewen et al.
(Continued)

FOREIGN PATENT DOCUMENTS

CN 109379564 2/2019
IN 201611017172 11/2017
(Continued)

OTHER PUBLICATIONS

International Search Report and Written Opinion dated Oct. 19, 2023 issued in International Application No. PCT/CA2023/051073.
(Continued)

*Primary Examiner* — Sherrie Hsia
(74) *Attorney, Agent, or Firm* — Onello & Mello, P.C.

(57) ABSTRACT

A system for georeferencing of markers and using the georeferenced position of the markers for detecting potential movement of the ground including a data capture subsystem mounted to an aerial vehicle and comprising mapping capture equipment and positioning equipment acquiring respectively mapping data and position data as they move over a region of interest, a marker identification module configured identifying markers located in the region of interest from the mapping data, a marker georeferencing module georeferencing at least a portion of the identified marker, a marker data source receiving and storing the marker georeferenced data, and a movement detection module receiving marker
(Continued)

georeferenced data associated to markers identified based on the mapping data and position data acquired at different points in time and compare the marker georeferenced data to detect if a movement or a movement trend of the markers.

20 Claims, 4 Drawing Sheets

(58) Field of Classification Search
USPC ............ 348/143, 144; 396/7; 382/103, 104, 382/154; 701/3, 16
See application file for complete search history.

(56) References Cited

U.S. PATENT DOCUMENTS

| | | | |
|---|---|---|---|
| 9,014,415 B2 | 4/2015 | Chen et al. | |
| 9,162,753 B1 | 10/2015 | Panto et al. | |
| 9,363,462 B2 | 6/2016 | Yoel | |
| 9,830,706 B2 | 11/2017 | Barajas Hernandez et al. | |
| 9,835,453 B2 | 12/2017 | Michini et al. | |
| 10,067,510 B2 | 9/2018 | Mullan et al. | |
| 10,275,402 B2 | 4/2019 | Guerriero et al. | |
| 10,303,966 B2 | 5/2019 | Coulter et al. | |
| 10,740,608 B2 | 8/2020 | Coulter et al. | |
| 11,086,025 B2 | 8/2021 | San Miguel et al. | |
| 2012/0320203 A1* | 12/2012 | Liu | G01C 11/04 348/E7.085 |
| 2017/0084037 A1 | 3/2017 | Barajas Hernandez et al. | |
| 2017/0235018 A1 | 8/2017 | Foster et al. | |
| 2018/0239031 A1 | 8/2018 | San Miguel et al. | |
| 2019/0054937 A1 | 2/2019 | Graetz et al. | |
| 2019/0303648 A1 | 10/2019 | Zhai et al. | |
| 2019/0362147 A1 | 11/2019 | Adam et al. | |
| 2019/0391255 A1 | 12/2019 | Runge et al. | |
| 2020/0066142 A1 | 2/2020 | Fowe et al. | |
| 2020/0294620 A1 | 9/2020 | Bauer et al. | |
| 2021/0055417 A1 | 2/2021 | Brokaw et al. | |

FOREIGN PATENT DOCUMENTS

| | | |
|---|---|---|
| IN | 201811040638 | 5/2020 |
| WO | 2020097197 | 5/2020 |

OTHER PUBLICATIONS

Warren et al. "Satellite-Based Pipeline Encroachment Monitoring Final Report", Pipeline Research Council International, Catalog No. PR394-113703-R03 (Mar. 13, 2012), 76 pages.
Deschamps et al. "Comparison of Radar Satellite Methods for Observation of Elevated Pipeline Infrastructure Stability", Pipeline Research Council International, Catalog No. PR-420-133721-R01 (Jul. 10, 2015), 51 pages.
Deschamps et al. "Quantification and Extension of Lateral Ground Movement Detection Capabilities Derived from Synthetic Aperture Radar", Pipeline Research Council International, Catalog No. PR-420-123712-R01 (Nov. 12, 2014), 74 pages.
Gunawardana et al. "Use of Aerial LiDAR Data Collection for Geohazard Assessment", Pipeline Research Council International, Catalog No. PR-680-183907-R01 (Aug. 8, 2019), 52 pages.
Down, Murray. "InSAR Monitoring of Pipeline Geohazards in Vegetated and Very Large Non-Vegetated Areas", Pipeline Research Council International, Catalog No. PR-686-183908-R01 (Jan. 31, 2020), 60 pages.
Olawale et al. "Real-Time Monitoring Of Buried Oil Pipeline Right-Of-Way for Third-Party Incursion", International Journal of Innovative Science, Engineering & Technology, vol. 2 Issue 2 (Feb. 2015), p. 163-173, available online at : https://www.researchgate.net/profile/Babatunde_Olawale/publication/272474580_REAL-TIME_MONITORING_OF_BURIED_OIL_PIPELINE_RIGHT-OF-WAY_FOR_THIRD-PARTY_INCURSION/ links/54e615640cf277664ff28e1a.pdf.
ULC Robotics, "Unmanned Aerial Inspection Ofgas Utility Transmission and Distribution Assets", online brochure (2020), 16 pages, available online at https://ulcrobotics.com/services/gas-utility-unmanned-aerial-inspection/.
Jadkowski, M.A. "Aerial imaging manages pipeline right-of-way programs", Pipeline & Gas Journal 223.n2: p54(3). Oildom Publishing Company of Texas, Inc. (Feb. 1996), 3 pages, available online at https://dialog.proquest.com/professional/printviewfile?accountid=157282.
American Petroleum Institute (API), "Line Markers and Signage for Hazardous Liquid Pipelines and Facilities", API Recommended Practice 1109, Fifth Edition (Oct. 2017), 25 pages, available online at https://www.api.org/~/media/Files/Oil-and-Natural-Gas/pipeline/Damage-Prevention/811Week_Sec_1109_e5_2017.pdf.
Nayeem et al. "Design and Optimization of an Unmanned Aerial Vehicle (UAV) for Pipe Line Inspection", International Journal of Research and Scientific Innovation (IJRSI), vol. VI, Issue XII (Dec. 2019), ISSN 2321-2705, 4 pages, available online at https://www.rsisinternational.org/journals/ijrsi/digital-library/volume-6-issue-12/06-09.pdf.
Um et al. "Pipeline construction and reinstatement monitoring: current practice, limitations and the value of airborne videography", The Science Of The Total Environment, 186 (Feb. 1996) p. 221-230, available online at https://www.sciencedirect.com/science/article/abs/pii/0048969796051157.
Remote Geosystems, "Aerial Pipeline Patrol GPS Video Recorders & GIS Mapping Solutions", Geotag Video from Airborne Pipeline Inspections and ROW Patrols for Review, Analysis & Reporting in GIS Applications (2020), 7 pages, available online at https://www.remotegeo.com/mission/airborne-video-recorders/aerial-pipeline-patrol.
Cazzato et al. "Vision-Based Aircraft Pose Estimation for UAVs Autonomous Inspection without Fiducial Markers", Interdisciplinary Centre for Security, Reliability and Trust, University of Luxembourg (2019), p. 5642-5648, available online at https://ieeexplore.IEEE.org/document/8926667.
Bauman et al. "Current Land and Waterborne Geophysical Methods for Guiding Horizontal Directional Drilling and Trenching Along Pipeline Right-Of-Ways", International Pipeline Conference & Exposition IPC2016 (Sep. 26-30, 2016), 10 pages, available online at https://pdfs.semanticscholar.org/27d6/d1817912e1ff3740674567639f350690bfc6.pdf ?_ ga=2.17771644.458618706.1603466136-2119436863.1602522840.
Ridolfi et al. "Accuracy Analysis of a Dam Model from Drone Surveys", DICA Department of Civil and Environmental Engineering, University of Perugia (Aug. 3, 2017), 19 pages, available online at https://www.mdpi.com/1424-8220/17/8/1777.
Donnellan et al. "Targeted High-Resolution Structure from Motion Observations over the Mw 6.4 and 7.1 Ruptures of the Ridgecrest Earthquake Sequence", Seismological Research Letters, XX, p. 1-9, (2020), doi: 10.1785/0220190274. Available online at https://media.physics.hmcedu/media/pubs/srl-2019274.1.pdf.
Huang et al. "Method and application of using unmanned aerial vehicle for emergency investigation of single geo- hazard", Nat. Hazards Earth Syst. Sci. Discuss., doi:10.5194/nhess-2017-44 (Feb. 6, 2017), 28 pages, available online at https://d-nb.info/1143054512/34.
Peppa et al. "3D landslide motion from a UAV-derived time-series of morphological attributes" Geophysical Research Abstracts, vol. 19, EGU2017-15074, 2017, available online at https://meetingorganizer.copernicus.org/EGU2017/ EGU2017-15074.pdf.
Zhang et al. "Evaluating the potential of post-processing kinematic (PPK) georeferencing for UAV-based structure from-motion (SfM) photogrammetry and surface change detection", Earth Surface Dynamics, 7 (Sep. 2, 2019), p. 807-827, available online at https://esurfcopernicus.org/articles/7/807/2019/.
Eling et al. "Development and Evaluation of AUAV Based Mapping System for Remote Sensing and Surveying Applications", The International Archives of the Photogrammetry, Remote Sensing and Spatial Information Sciences, vol. XL-1/W4, 2015, International Conference on Unmanned Aerial Vehicles in Geomatics, (Aug. 30-Sep. 2, 2015), p. 233-239, available online at https://pdfs.

(56) References Cited

OTHER PUBLICATIONS semanticscholar.org/e783/11cdec32aab2a96ead0f1dde0a28b2b9ca0fpdf?
Forlani et al. "Indirect UAV Strip Georeferencing by On-Board GNSS Data under Poor Satellite Coverage", Remote Sensing 2019, 11, 1765; doi:10.3390/rs111517652019, 20 pages, available online at https://www.mdpi.com/2072-4292/11/15/1765.
Stroner et al. "Evaluation of the Georeferencing Accuracy of a Photogrammetric Model Using a Quadrocopter with Onboard GNSS RTK", Sensors 2020, 20, 2318; doi:10.3390/s20082318, 17 pages, available online at https://www.ncbi.nlm.nih.gov/pmc/articles/PMC7219658/.

* cited by examiner

SYSTEM AND METHOD FOR GEOREFERENCING OF MARKERS USING AERIAL VEHICLE AND USE OF THE GEOREFERENCED POSITION OF THE MARKERS FOR DETECTING POTENTIAL MOVEMENT OF THE GROUND AND/OR OVERGROWTH OF VEGETATION

CROSS-REFERENCE TO RELATED APPLICATIONS

This application claims priority under 35USC§ 119(e) of U.S. provisional patent application 63/371,162 filed on Aug. 11, 2022, the specification of which being hereby incorporated by reference.

TECHNICAL FIELD OF THE INVENTION

The present invention relates to the field of aerial inspection and monitoring. More particularly, it relates to a system and a method for performing automated georeferencing and inventory of markers using an aerial vehicle and using the georeferenced position of the markers for detecting potential movement of the ground in the vicinity of one or more of the georeferenced markers, as well as overgrowth of vegetation.

BACKGROUND

Different aerial or satellite-based methods are known in the art for monitoring the movement of the ground, for example to try and detect potential geohazards in regions of interest, which could have unfortunate consequences.

For example and without being limitative, it is known to capture satellite radar imagery and perform the analysis of the satellite radar imagery to monitor the movement of the ground surfaces for the regions of interest, in order to identify anormal shifts of at least portions of the ground surface and potential damage threats.

Satellite radar imagery is however limited in terms of precision in imagery and cannot be used to precisely identify and georeference small objects such as markers used in rights-of-ways (ROW) or in other regions to be monitored. Indeed, markers are embodied using a sign installed on a post, while radar imagery can commonly only be used to see objects of a larger size, such that radar imagery cannot be efficiently used to identify objects as small as the markers commonly used in rights-of-ways (ROW) or similar locations.

It is also known to use remote sensing technologies, such as LiDAR or the like, to perform airborne data collection at different time periods. Such airborne data collections provide raw remote sensing data, for example in the form of point clouds, intended for post-processing and analysis to identify features and to map the ground surfaces from the generated point clouds in order to measure topographic changes over time and identify potential geohazards. Such methods and systems however require the use of expensive equipment and/or high processing power and/or time for detection of movement along the ground surface between the mapped ground surfaces at different points in time.

It is further known to use aerial images of a pipeline ROW captured by an unmanned aerial vehicle (UAV) to perform comparison between the captured aerial images of the ground surface of the pipeline ROW and previously captured images of the ground surface of the pipeline ROW during a subsequent post-processing step, to detect topographic changes in the surface of the ground along the pipeline ROW (or surrounding the pipeline ROW). However, systems or methods for comparing captured aerial images of the ground surface of the pipeline ROW to detect topographic changes in the surface of the ground along the pipeline ROW again require high processing power and/or time.

It is also further known to perform pipeline ROW surveillance and threat detection based on images captured by an unmanned aerial vehicle (UAV) to identify and georeference elements of interest that could represent a potential danger for the pipeline. Indeed, it is known to capture a sequence of images via the UAV to form a digital surface model (DSM) that is compared to an existing map for georeferencing and to perform identification of objects of interest stored in a database, with detection being achieved by searching for a match between objects identified in the images and objects of interest stored in the database and georeferencing the object of interest to its exact location once it has been detected. Such systems or methods however only detect objects on the region of interest that can be considered a threat. without any interest or possibility of detecting movement of the ground surface which can be indicative of potential geohazards from the location of the identified objects of interest.

In view of the above, there is a need for an improved system and method for performing georeferencing of markers using an aerial vehicle and using the georeferenced position of the markers for detecting potential movement of the ground, which, by virtue of its design and/or components, would be able to overcome or at least minimize some of the above-discussed prior art concerns.

SUMMARY OF THE INVENTION

In accordance with a first general aspect, there is provided a system for georeferencing of markers using aerial vehicle and using the georeferenced position of the markers for detecting potential movement of the ground. The system comprises: a data capture subsystem, a marker identification module a marker georeferencing module, a marker data source and a movement detection module. The data capture subsystem is mounted to an aerial vehicle and comprises mapping capture equipment acquiring mapping data representative of a region of interest as the aerial vehicle is flown over the region of interest and positioning equipment simultaneously acquiring position data relative to the position and orientation of the aerial vehicle and the components performing the acquisition of the mapping data. The marker identification module is configured to receive the mapping data generated using the data capture subsystem and to identify at least portions of markers located in the region of interest, based on the received mapping data, the marker identification module generating marker identification data therefrom. The marker georeferencing module is configured to receive and process the marker identification data and the position data and to georeference at least a portion of the identified at least portions of markers therefrom, the marker georeferencing module generating marker georeferenced data. The marker data source receives and stores the marker georeferenced data. The movement detection module is configured to receive the marker georeferenced data associated to at least one marker identified based on the mapping data and position data acquired at different points in time and compare the marker georeferenced data of the at least one marker at the different points in time to detect if one of a movement or a movement trend of the at least one marker has occurred.

In an embodiment, the mapping capture equipment includes a high-definition camera and the mapping data of the region of interest includes aerial images thereof.

In an embodiment, the marker georeferencing module is configured to associate pixels corresponding to the at least portion of the identified at least portions of markers to a coordinate, as part of the marker georeferenced data.

In an embodiment, wherein the mapping capture equipment further includes 3D remote scanning equipment and the mapping data of the region of interest further includes a point cloud of measurements of individual measurement points along the region of interest.

In an embodiment, the marker georeferencing module is configured to associate points of the point cloud corresponding to the at least portion of the identified at least portions of markers to a coordinate, as part of the marker georeferenced data.

In an embodiment, the marker identification module is further configured to identify specific reference features located in the region of interest based on the received mapping data, and include the data relative to the identification of the specific reference features in the generated marker identification data, and the marker georeferencing module is configured to acquire reference georeferenced data including GPS control points associated to the specific reference features having known GPS position and to either correct or adjust the position data prior to performing georeferencing of the at least portion of the identified at least portions of the markers or to correct or adjust the georeferencing of the a least portion of the identified at least portions of the markers as a post processing step before generating the marker georeferenced data.

In an embodiment, the positioning equipment includes a high precision global navigation satellite system receiver, an altimeter and an inertial measurement unit.

In an embodiment, the region of interest is one of a pipeline right-of-way, a power line right-of-way, a railway right-of-way, and a coastal road.

In an embodiment, the marker identification module is configured to identify at least portions of at least one of signs mounted on support posts planted into the ground, posts to which the signs are mounted, and a section of the posts positioned at a junction of a ground surface as the at least portions of markers located in the region of interest.

In an embodiment, the movement detection module is further configured to analyze the movement of at least two markers located in the vicinity of one another and to determine if a movement trend can be detected from the movement of the markers located proximate to one another.

In an embodiment, the movement detection module is further configured to characterize the movement trend to associate the movement trend with a type of ground movement and determine if the type of ground movement is representative of a potential geohazard.

In an embodiment, the movement detection module is further configured to detect if the movement of the at least one marker results in the at least one marker being inoperative.

In an embodiment, the marker georeferencing module is configured to determine and georeference a summit for each one of the identified markers.

In an embodiment, wherein the marker identification module is further configured to detect vegetation in the vicinity of the at least one marker identified based on the mapping data, the marker georeferencing module is configured to determine a height of the vegetation in the vicinity of the at least one marker from a ground surface and the movement detection module is further configured to determine if the height of the vegetation is above a vegetation height threshold indicative of overgrowth of the vegetation.

In an embodiment, wherein the marker identification module is further configured to detect vegetation in the vicinity of the at least one marker identified based on the mapping data, the marker georeferencing module is configured to determine a relative height of the vegetation in the vicinity of the at least one marker relative to the summit of the at least one marker and the movement detection module is further configured to determine if the relative height of the vegetation is above a vegetation height threshold indicative of overgrowth of the vegetation.

In accordance with another general aspect, there is provided a method for georeferencing of markers using aerial vehicle and using the georeferenced position of the markers for detecting potential movement of the ground. The method comprises the steps of: simultaneously acquiring mapping data of a region of interest and position data relative to the position and orientation of an aerial vehicle and components mounted to the aerial vehicle for performing the acquisition of the mapping data, as the aerial vehicle is flown over the region of interest; receiving the mapping data and identifying therefrom markers located in the region of interest to generate marker identification data; receiving and processing the marker identification data and the position data and georeferencing therefrom at least a portion of the identified markers to generate marker georeferenced data; storing the marker georeferenced data in a marker data source; and receiving and comparing marker georeferenced data associated with at least one marker identified based on the mapping data and position data acquired at different points in time and determining therefrom if a movement or a movement trend of the marker has occurred between the different points in time.

In an embodiment, the step of receiving the mapping data and identifying therefrom markers located in the region of interest comprises performing image processing using predetermined image processing algorithms, in order to identify at least a portion of the markers located in the region of interest.

In an embodiment, the step of receiving and processing the marker identification data and the position data and georeferencing therefrom at least a portion of the identified marker comprises associating pixels corresponding to at least a portion of a marker to a coordinate as part of the marker georeferenced data.

In an embodiment, the step of receiving the mapping data and identifying therefrom markers located in the region of interest comprises performing object detection from a point cloud using predetermined algorithms or processes, in order to identify at least a portion of the markers located in the region of interest.

In an embodiment, the step of receiving the mapping data and identifying therefrom markers located in the region of interest further comprises detecting specific reference features from the mapping data of the region of interest and including the data representative of the identified reference features from the mapping data of the region of interest in the generated marker identification data.

In an embodiment, the method further comprises acquiring reference georeferenced data including known position of GPS control points associated to the specific reference features found in the mapping data, from a marker data source, and the step of receiving and processing the marker identification data and the position data and georeferencing therefrom at least a portion of the identified markers to generate marker georeferenced data further includes correcting or adjusting the position data prior to performing georeferencing of the a least portion of the identified markers and generating the marker georeferenced data or to correct or adjust the georeferencing of the a least portion of the identified markers as a post processing step before generating the marker georeferenced data.

In an embodiment, the step of receiving and processing the marker identification data and the position data and georeferencing therefrom at least a portion of the identified marker includes associating points of the point cloud corresponding to at least a portion of a marker to a coordinate as part of the marker georeferenced data.

In an embodiment, the step of receiving the marker georeferenced data associated to at least one marker identified based on the mapping data and position data acquired at a first time period and at second time period subsequent to the first time period and comparing the marker georeferenced data of the at least one marker at the first time period with the marker georeferenced data of the at least one marker at the second time period comprises analyzing the movement of at least two markers located in the vicinity of one another and determining therefrom if a movement trend can be detected from the movement of the markers located proximate to one another.

In an embodiment, the method further comprises characterizing the movement trend to associate the movement trend with a type of ground movement and determining if the type of ground movement is representative of a potential geohazard.

In an embodiment, the step of receiving the marker georeferenced data associated to at least one marker identified based on the mapping data and position data acquired at a first time period and at second time period subsequent to the first time period and comparing the marker georeferenced data of the at least one marker at the first time period with the marker georeferenced data of the at least one marker at the second time period comprises detecting if the movement of the at least one marker results in the at least one marker being inoperative.

In an embodiment, the step of receiving and processing the marker identification data and the position data and georeferencing therefrom at least a portion of the identified markers to generate marker georeferenced data comprises the substep of determining and georeferencing a summit for each one of the identified markers.

In an embodiment, the method further comprises detecting vegetation in the vicinity of the at least one marker identified based on the mapping data, determining a height of the vegetation from a ground surface in the vicinity of the at least one marker, and determining if the height of the vegetation is above a vegetation height threshold indicative of overgrowth of the vegetation.

In an embodiment, the method further comprises detecting vegetation in the vicinity of the at least one marker identified based on the mapping data, determining a relative height of the vegetation in the vicinity of the at least one marker relative to the summit of the at least one marker, and determining if the relative height of the vegetation is above a vegetation height threshold indicative of overgrowth of the vegetation.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

DETAILED DESCRIPTION

Figure 1:
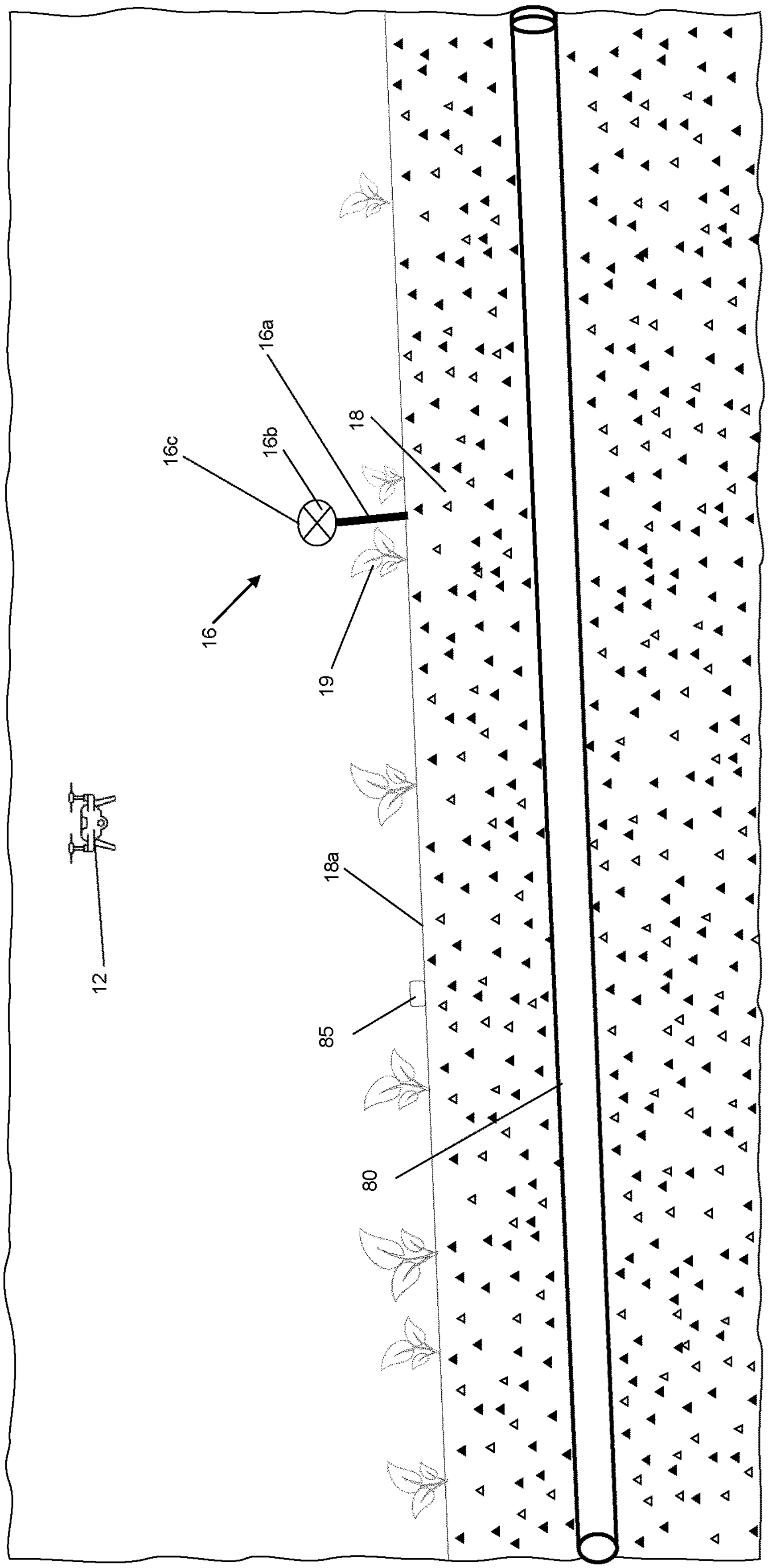
FIG. 1 is a schematic representation illustrating elements used by the system for georeferencing of markers using aerial vehicle and using the georeferenced position of the markers for detecting potential movement of the ground, according to an embodiment.

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the system for performing georeferencing of markers using an aerial vehicle and using the georeferenced position of the markers for detecting potential movement of the ground and/or overgrowth of vegetation using the markers as a known reference to assess the height of ground cover and any obstruction caused by tree canopies, and corresponding parts thereof consist of certain components and/or architecture as explained and illustrated herein, not all of these components and/or configuration of the architecture are essential and thus should not be taken in their restrictive sense. It is to be understood, as also apparent to a person skilled in the art, that other suitable components and cooperation thereinbetween, as well as other suitable architectures, may be used for the system for performing georeferencing of markers using an aerial vehicle and using the georeferenced position of the markers for detecting movement of the ground in the vicinity of one or more of the georeferenced markers, as will be briefly explained herein and as can be easily inferred herefrom by a person skilled in the art.

Moreover, although the associated method includes steps as explained and illustrated herein, not all of these steps are essential and thus should not be taken in their restrictive sense. It will be appreciated that the steps of the method for performing georeferencing of markers using an aerial vehicle and using the georeferenced position of the markers for detecting potential movement of the ground and/or overgrowth of vegetation described herein may be performed in the described order, or in any suitable order. In an embodiment, steps of the proposed method are implemented as software instructions and algorithms, stored in computer memory and executed by processors. It should be understood that servers and computers are therefore required to implement to proposed system, and to execute the proposed method. In other words, the skilled reader will readily recognize that steps of the method can be performed by programmed computers. In view of the above, some embodiments are also intended to cover program storage devices, e.g., digital data storage media, which are machine or computer readable and encode machine-executable or computer-executable programs of instructions, wherein said instructions perform some or all of the steps of said above-described methods. The embodiments are also intended to cover computers programmed to perform said steps of the above-described methods.

To provide a more concise description, some of the quantitative and qualitative expressions given herein may be qualified with the terms "about" and "substantially". It is understood that whether the terms "about" and "substantially" are used explicitly or not, every quantity or qualification given herein is meant to refer to an actual given value or qualification, and it is also meant to refer to the approximation to such given value or qualification that would reasonably be inferred based on the ordinary skill in the art, including approximations due to the experimental and/or measurement conditions for such given value.

The term "computing device" is used to encompass computers, servers and/or specialized electronic devices which receive, process and/or transmit data. "Computing devices" are generally part of "systems" and include processing means, such as microcontrollers and/or microprocessors, CPUs or are implemented on FPGAS, as examples only. The processing means are used in combination with storage medium, also referred to as "memory" or "storage means". Storage medium can store instructions, algorithms, rules and/or data to be processed. Storage medium encompasses volatile or non-volatile/persistent memory, such as registers, cache, RAM, flash memory, ROM, as examples only. The type of memory is of course chosen according to the desired use, whether it should retain instructions, or temporarily store, retain or update data.

One skilled in the art will therefore understand that each such computing device typically includes a processor (or multiple processors) that executes program instructions stored in the memory or other non-transitory computer-readable storage medium or device (e.g., solid-state storage devices, disk drives, etc.). The various functions, modules, services, units or the like disclosed hereinbelow can be embodied in such program instructions, and/or can be implemented in application-specific circuitry (e.g., ASICs or FPGAs) of the computing devices. Where a computer system includes multiple computing devices, these devices can, but need not, be co-located. In some embodiments, a computer system can be a cloud-based computing system whose processing resources are shared by multiple distinct business entities or other users.

It should be appreciated by those skilled in the art that any block diagrams herein represents conceptual views of illustrative circuitry embodying the principles disclosed herein. Similarly, it will be appreciated that any flow charts and transmission diagrams, and the like, represent various processes which may be substantially represented in computer readable medium and so executed by a computer or processor, whether or not such computer or processor is explicitly shown.

The terms "a", "an" and "one" are defined herein to mean "at least one", that is, these terms do not exclude a plural number of items, unless stated otherwise.

Unless stated otherwise, the terms "connected" and "coupled", and derivatives and variants thereof, refer herein to any structural or functional connection or coupling, either direct or indirect, between two or more elements. For example, the connection or coupling between the elements can be acoustical, mechanical, optical, electrical, thermal, logical, or any combinations thereof.

In the present description, the expression "based on" is intended to mean "based at least partly on", that is, this expression can mean "based solely on" or "based partially on", and so should not be interpreted in a limited manner. More particularly, the expression "based on" could also be understood as meaning "depending on", "representative of", "indicative of", "associated with" or similar expressions.

Moreover, the modules, data sources and other components of the system described herein can be in data communication through direct communication such as a wired connection or via a network allowing data communication between computing devices or components of a network capable of receiving or sending data, which includes publicly accessible networks of linked networks, possibly operated by various distinct parties, such as the Internet, private networks (PN), personal area networks (PAN), local area networks (LAN), wide area networks (WAN), cable networks, satellite networks, cellular telephone networks, etc. or combination thereof.

Broadly described, and without limiting various embodiments described herein, systems and method described herein can be used to detect movement of the ground in the vicinity of one or more of georeferenced markers found in a region of interest, by initially acquiring mapping data and position data relative to the region of interest using an aerial vehicle flying over the region of interest, identifying and georeferencing markers found in the region of interest from the acquired mapping data and position data, and comparing the data relative to the georeferenced markers with previously acquired data of the georeferenced markers, for detecting changes in position in the X, Y, Z plane (i.e. ground surface position, tilt and elevation) of the georeferenced markers as indicative of potential geohazards related to movement of the ground in the vicinity of one or more of the markers.

Figure 2A:
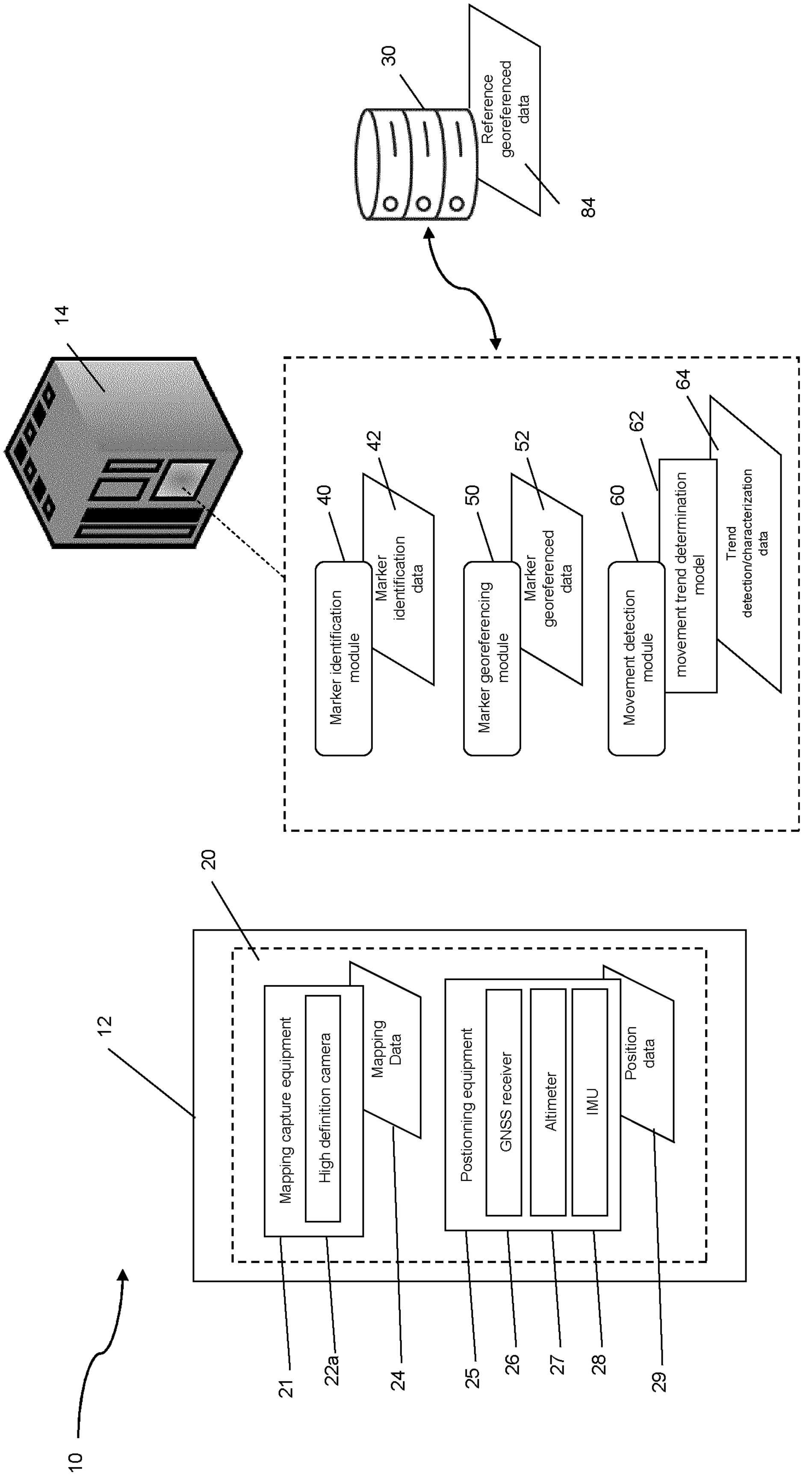
FIG. 2*a* is a schematic representation illustrating the system for georeferencing of markers using aerial vehicle and using the georeferenced position of the markers for detecting potential movement of the ground, according to an embodiment.
Figure 2B:
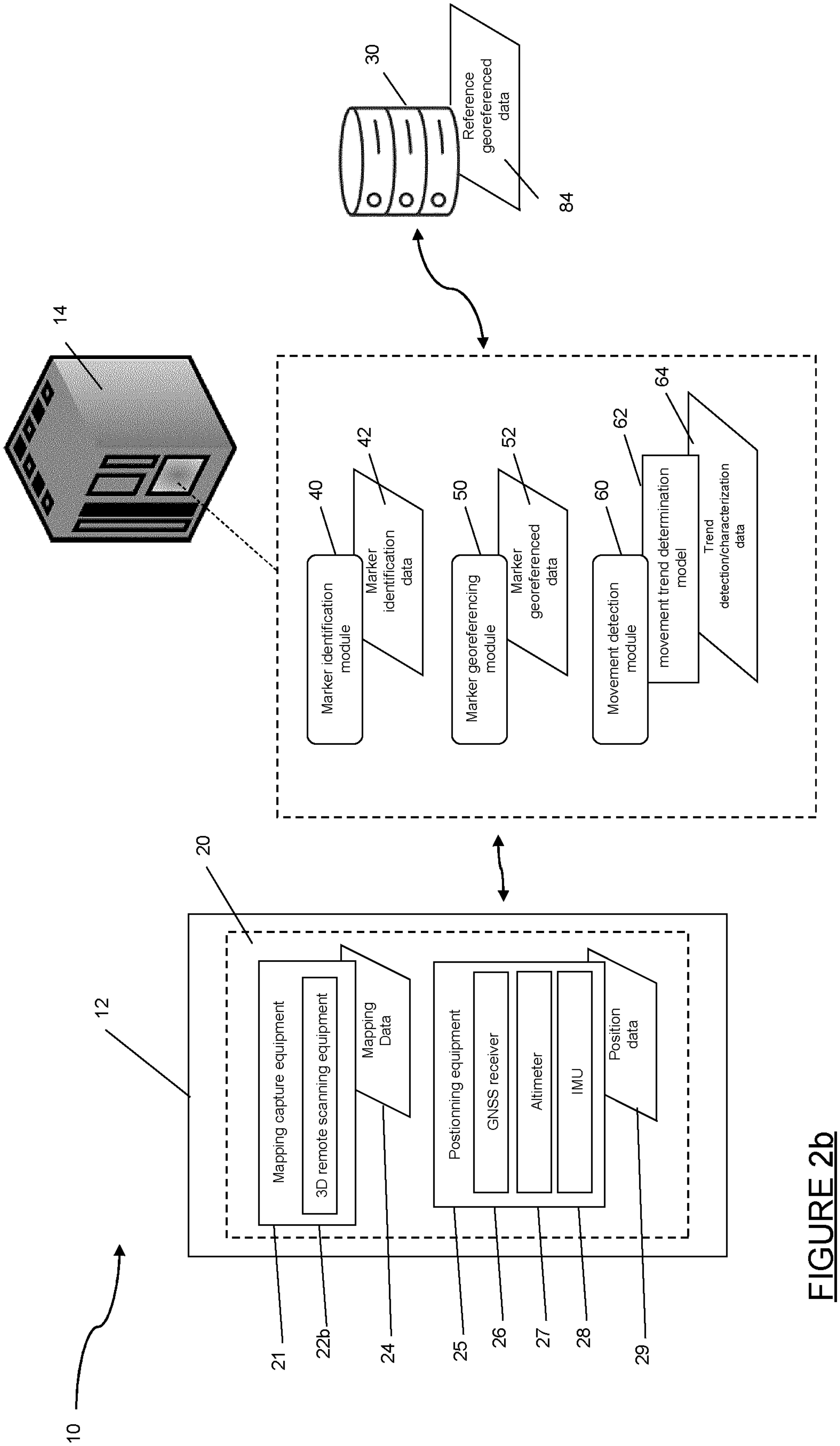
FIG. 2*b* is a schematic representation illustrating the system for georeferencing of markers using aerial vehicle and using the georeferenced position of the markers for detecting potential movement of the ground, according to an alternative embodiment.

Referring generally to FIGS. 1, 2*a* and 2*b*, in accordance with possible embodiments, there are shown schematic diagrams of the operational modules and/or subsystems/units of the system 10 for performing georeferencing of markers 16 found in a region of interest, using an aerial vehicle 12, and using the georeferenced position of the markers 16 for detecting movement of the ground 18 in the vicinity of one or more of the georeferenced markers 16. The architecture includes modules and components for performing the required actions and tasks for the system 10 to operate.

In more details, FIGS. 2*a* and 2*b* show the architecture of the system 10 in accordance with two alternative embodiments shown, where different equipment is used for capturing mapping data of the region of interest as it is flown over by the aerial vehicle 12. In the embodiment shown in FIG. 2*a*, the mapping capture equipment 21 includes a high-definition camera 22 capturing images of the region of interest as it is flown over by the aerial vehicle 12, while in FIG. 2*b*, the mapping capture equipment 21 includes 3D remote scanning equipment capturing measurements of individual measurement points along the region of interest as it is flown over by the aerial vehicle 12.

More specifically, in the embodiments shown, the system 10 is an airborne image-based inspection system 10 including a data capture subsystem 20 mounted to an aerial vehicle 12, one or more system computing devices 14, such as servers, and a marker data source 30. As will be described in more details below, in the embodiments shown, the system computing device 14 further includes a marker identification module 40, a marker georeferencing module 50, and a movement detection module 60.

The marker data source 30 is any data source medium which can receive and store data thereon such as a database, a data repository, a data store, a data file, etc. One skilled in the art will understand that each module described in the present application can be implemented via programmable computer components, such as one or more physical or virtual computers comprising a processor and memory having instructions stored thereon. It is appreciated, however, that other configurations are possible.

In an embodiment, the region of interest being monitored by the aerial vehicle, and for which markers are georeferenced and used to detect potential geohazard is one of a pipeline right-of-way (ROW), a power line ROW, a railway ROW, a coastal road or the likes. One skilled in the art will however understand that, in alternative embodiment, other types of regions of interest could be monitored.

The aerial vehicle 12 can be any aircraft capable of flying over the region of interest, at a convenient speed and flight altitude to allow acquisition of mapping data 24 with sufficient precision to perform the subsequent post processing as described below. For example and without being limitative, in an embodiment, the aerial vehicle 12 can be an helicopter, a small airplane, an unmanned aerial vehicle UAV, or the like. In a preferred embodiment, the aerial vehicle 12 is a UAV (i.e. a drone). The UAV can be any type or size of UAV flown by a local or remote pilot.

The data capture subsystem 20 is mounted onto the aerial vehicle 12 and includes mapping capture equipment 21 and positioning equipment 25 to allow the acquisition of mapping data 24 of the region of interest as it is flown over by the aerial vehicle 12 and the georeferencing of the acquired mapping data 24 using position data 29 measured by the positioning equipment 25, while the mapping data 24 is collected by the mapping capture equipment 21. As will be described in more details below, the georeferencing of the collected mapping data 24 allows the subsequent georeferencing of the markers 16 identified in the captured images.

As mentioned above, in the embodiment shown in FIG. 2*a*, the mapping capture equipment 21 includes a high-definition camera 22*a* capturing images of the region of interest as it is flown over by the aerial vehicle 12. Therefore, it will be understood that, in such an embodiment, the mapping data 24 of the region of interest includes aerial images thereof. In an embodiment, the high-definition camera 22 is a specialized camera optimized for aerial image capture. The high-definition camera 22 is positioned on the aerial vehicle 12 with the field of view of the camera being directed towards the ground surface 18*a*, such that the high-definition camera 22 can capture images of the region of interest, from above, as the aerial vehicle 12 is flown over the region of interest.

In the alternative embodiment shown in FIG. 2*b*, the mapping capture equipment 21 includes 3D remote scanning equipment, such as, for example and without being limitative, a Lidar sensor or the like. One skilled in the art will understand that any sensors allowing 3D scanning of the region of interest as it is flown over by the aerial vehicle 12 can be used. The 3D remote scanning equipment (or additional sensors) allow acquisition of measurements of individual measurement points along the region of interest as it is flown over by the aerial vehicle 12, to form a point cloud representing a 3D version of the region of interest from which the subsequent identification and georeferencing of the markers 16 can be performed by the system 10, as described in more details below.

The positioning equipment 25 includes the required material for collecting position data 29 required to perform accurate direct georeferencing of the collected mapping data 24 acquired by the data capture subsystem 20 (e.g., images or laser scan point clouds), and therefore connecting the collected mapping data 24 to the corresponding geographic positioning on the ground.

In the embodiment shown, the positioning equipment 25 includes a high precision global navigation satellite system (GNSS) receiver 26, an altimeter 27 and an inertial measurement unit (IMU) 28. The GNSS receiver 26, altimeter 27 and IMU 28 respectively measure the position, the altitude and the angular movement of the aerial vehicle 12 (or components of the mapping capture equipment 21 mounted thereon), during acquisition of the mapping data 24. Hence, the GNSS receiver 26, altimeter 27 and IMU 28 cooperate to repeatedly measure the true 3D coordinates (e.g. X; Y; Z) and orientation angles of the components of the mapping capture equipment 21 carried by the aerial vehicle 12 and therefore allow direct georeferencing of the collected mapping data 24.

In an embodiment, the data capture subsystem 20 is in data communication with the system computing device 14, such that the data acquired by the data capture subsystem 20, including the mapping data 24 and position data 29, can be communicated to the system computing device 14 for subsequent processing. In an alternative embodiment, the data acquired by the data capture subsystem 20 can be captured inflight and temporarily stored on a local storage medium of the data capture subsystem 20, to be subsequently uploaded to the system computing device 14.

The marker identification module 40 is configured to receive the mapping data 24 generated using the data capture subsystem 20 and to identify markers located in the region of interest based on the received mapping data 24. In other words, the marker identification module 40 is configured to detect the presence of markers in the region of interest, from the mapping data 24 acquired by the system 10. The marker identification module 40 generates marker identification data 42 representative of the markers identified and located in the region of interest shown in the mapping data 24.

In the embodiment shown in FIG. 2*a*, where the mapping data 24 includes aerial images of the region of interest, the marker identification module 40 can be configured to perform image processing using predetermined image processing algorithms, in order to identify at least a portion of the markers 16 located in the region of interest from the received mapping data 24. One skilled in the art will understand that numerous image processing algorithms could be used. More specifically, in an embodiment the marker identification module 40 can use object detection algorithms for performing the identification and localization of the markers (or at least portions thereof) located in the region of interest, from the received mapping data 24, such as, for example and without being limitative, the convolutional neural networks algorithm (R-CNN, Region-Based Convolutional Neural Networks), Fast R-CNN algorithm, YOLO algorithm (You Only Look Once) algorithm, or the like. One skilled in the art will understand that, in alternative embodiments, different algorithms, techniques, or more generally computer vision tasks can be implemented by the marker identification module 40, in order to identify and/or localize the markers 16 (or at least portions thereof) located in the region of interest, from the received mapping data 24.

In the alternative embodiment shown in FIG. 2*b* where the mapping data 24 includes a point cloud representing a 3D version of the region of interest, the marker identification module 40 can be configured to perform object detection from the 3D point cloud using predetermined algorithms or processes, in order to identify at least a portion of the markers 16 located in the region of interest, from the received mapping data 24. Once again, one skilled in the art will understand that numerous 3D point cloud processing algorithms or processes could be used. More specifically, in an embodiment the marker identification module 40 can use 3D object detection algorithms based on deep learning (e.g. R-CNN based 3D object detection algorithms) to find the 2D crop of the object and estimate the 3D bounding box of the object.

One skilled in the art will understand that, in another alternative embodiment (not shown), the mapping capture equipment 21 could include both a high-definition camera 22 capturing images of the region of interest as it is flown over by the aerial vehicle 12 and 3D remote scanning equipment capturing measurements of individual measurement points along the region of interest as it is flown over by the aerial vehicle 12. It will be understood that, in such an embodiment where the mapping data 24 includes a combination of aerial images of the region of interest and a 3D point cloud of the region of interest, the marker identification module 40 could be configured to perform the identification the markers 16 located in the region of interest from either one of the aerial images of the region of interest and the 3D point cloud of the region of interest of the mapping data 24, or a combination of both, for example to minimize the processing power and/or processing time, to maximize the accuracy of the detection, etc.

It should be understood that different algorithms, techniques, or more generally computer vision tasks can be implemented by the marker identification module 40, in order to identify and/or localize the markers 16 located in the region of interest, from the received mapping data 24.

In an embodiment, the system 10 is further configured to store reference georeference data 84 including Global Positioning System (GPS) control points associated to specific reference features 85 located on the ground surface 18*a* over the course of a pipeline 80 located along a corresponding ROW defining the region of interest for which the one or markers 16 are to be georeferenced. Such reference features located at the GPS control points can for example be used by a system (not shown) for performing various maintenance operations of a pipeline such as, for example and without being limitative, inspection of the pipeline 80, using a Pipeline Inspection Gauge (PIG) (not shown).

Indeed, when performing maintenance of pipeline using a PIG, the PIG cannot use outside positioning data, such as GPS coordinates from a GPS signal provider, given the working environment of the PIG which includes thick walls of a metallic pipeline 80 buried underground that cannot be crossed by the GPS signal. However, in order to perform proper inspection of the Pipeline, it is required to generate position data defining the position of the PIG along the pipeline while the data relative to the inner surface of the pipeline is collected. Therefore, it is common to define GPS control points along the length of the pipeline which are used to correct or validate the position of the PIG determined by the positioning system of the PIG during the inspection of the length of the pipeline. For example and without being limitative, the known position of the PIG when it reaches the corresponding GPS control point can be used to correct the position data generated by the positioning system of the PIG during the inspection of the length of the pipeline during post processing of the data to generate accurate inspection data.

For example, and without being limitative, in an embodiment, the GPS control points of the reference georeference data 84 are associated to the reference features 85 located on the ground at the specific known GPS coordinates and including equipment allowing determination that the PIG has reached the corresponding GPS control point during the inspection. For example and without being limitative, in an embodiment, the reference features 85 can include a sensor capable of detecting the magnetic field generated by the passage of the PIG within its course along the pipeline to determine that the PIG has reached the corresponding GPS control point.

In the present case, the reference georeferenced data 84 including the GPS control points associated to the specific reference features 85 located on the ground surface 18*a* over the course of the pipeline 80 can be received by the system 10 and stored in the marker data source 30. As will be described in more details below, the reference georeferenced data can be acquired and used by the marker georeferencing module for georeferencing of the identified markers 16.

Therefore, in the embodiment where the reference georeferenced data 84 is received by the system 10 and stored in the marker data source 30, the marker identification module 40 is further configured to perform the identification and localization of the specific reference features 85 located in the region of interest from either one of the aerial images of the region of interest and the 3D point cloud of the region of interest of the mapping data 24 captured by the mapping capture equipment 21 (or a combination of both).

One skilled in the art will understand that similar image processing algorithms or 3D point cloud processing algorithms to those used for performing the perform the identification and localization of the markers 16 located in the region of interest can be used for the identification and localization of the specific reference features 85 located in the region of interest from the received mapping data 24. In such an embodiment, the marker identification data 42 generated by the marker identification module 40 also includes the data representative of the specific reference features 85 located in the region of interest.

In an embodiment, the markers 16 can include a sign portion 16*b* (e.g., round shaped signs or polygonal shaped signs, having specific written content), mounted on support posts 16*a* planted into the ground 18. In such embodiments, the marker identification module 40 can be configured to perform the identification and localization of the sign portion 16*a* as being a marker for the region of interest in the marker identification data 42. In an alternative embodiment, the marker identification module 40 can be configured to perform the identification and localization of the combination of the sign portion 16*b* and the post 16*a* as being a marker 16 for the region of interest in the marker identification data 42. In another alternative embodiment, the marker identification module 40 can be configured to perform the identification and localization of the combination of the sign portion 16*b* and the post 16*a* as being a marker 16 for the region of interest and to specifically identify and locate a section of the post 16*b* positioned at the junction of the ground surface 18*a* in the marker identification data 42.

In an embodiment (not shown), the markers 16 can include an identification code on the sign portion thereof, such as, for example and without being limitative, a QR code or the like, of a size sufficient to be detected by the marker identification module 40 from the mapping data 24 including aerial images of the region of interest. For example and without being limitative, the identification code can include hard coded information such as, for example and without being limitative a marker ID or serial number, an operator name or ID, an initial georeferenced position of the marker, a marker installation date, etc. In an alternative embodiment, the identification code can provide a link, a marker ID or the like, to acquire marker information associated to this specific marker 16 from a data source associated to the marker, such as, for example and without being limitative, the marker data source 30 which will be described in more details below. For example and without being limitative, the marker information can also include the marker ID or serial number, the operator name or ID, the installation date, a last known georeferenced position of the marker, etc.

In an embodiment, the marker identification module 40 can be further configured to perform vegetation detection in order to detect the presence of vegetation in the vicinity of the markers 16. More precisely, in an embodiment, the marker identification module 40 is configured to detect the vegetation in the vicinity of each one of the markers 16, from the received mapping data 24, using the above-described processes, tools, or the like.

In an embodiment, the marker identification data 42 can be stored in the marker data source 30. In such an embodiment, the marker georeferencing module 50 is configured to receive the marker identification data 42 from the marker data source 30. In an alternative embodiment, the marker georeferencing module 50 can be connected to the marker identification module 40 to receive the marker identification data 42 directly from the marker identification module 40.

The marker georeferencing module 50 is configured to receive and process the marker identification data 42 and the position data 29, to georeference the identified markers 16. In other words, the marker georeferencing module 50 uses the combination of the data relative to the georeferenced region of interest provided by the combination of the mapping data 24 and position data 29 and the marker identification data 42 identifying the markers 16 in this region of interest, to precisely georeference at least a portion of the markers 16 and generate marker georeferenced data 52.

In the previously described embodiment where the mapping data 24 includes aerial images of the region of interest, the marker georeferencing module 50 can be configured to associate pixels corresponding to at least a portion of a marker 16 (i.e. at least a portion of the sign portion 16*b* or the post 16*a*) to a coordinate (e.g. X; Y; Z) as part of the marker georeferenced data 52. Similarly, in the previously described embodiment where the mapping data 24 includes a point cloud representing the region of interest, the marker georeferencing module 50 is therefore configured to associate points of the point cloud corresponding to at least a portion of a marker 16 (i.e. at least a portion of the sign portion 16*b* or the post 16*a*) to a coordinate (e.g. X; Y; Z) as part of the marker georeferenced data 52.

In an embodiment, the marker georeferencing module 50 can be configured to determine and georeference a summit 16*c* for each one of the identified markers 16. For example and without being limitative, in the embodiment shown in FIG. 1, the marker georeferencing module 50 can be configured to determine what is the georeferenced pixel or point of the point cloud that is the highest for the associated marker 16, and use the coordinate (e.g. X; Y; Z) of that georeferenced pixel or point of the point cloud as the summit 16*c* for the associated marker 16.

In another embodiment, the marker georeferencing module 50 can be further configured to determine a height of the vegetation 19 in the vicinity of each one of the detected markers 16. For example and without being limitative, in an embodiment the height of the vegetation 19 in the vicinity of each one of the detected markers 16 can be determined as a relative height with regard to the georeferenced summit 16*c* of the associated marker 16, as determined by the marker georeferencing module 50. In an alternative embodiment, the height of the vegetation in the vicinity of each one of the detected markers 16 can be a height measured from a georeferenced position of the ground surface 18*a*.

In the embodiment where the reference georeferenced data 84 is received by the system 10 and stored in the marker data source 30, the marker georeferencing module 50 can be configured to acquire the reference georeferenced data 84 from the marker data source 30 and use the known position of the GPS control points associated to the specific reference features 85 found in the mapping data 24 and previously identified therefrom by the marker identification module 40 and included in the generated marker identification data 42, to either correct or adjust the position data 29 prior to performing georeferencing of the a least a portion of the markers 16 and generating of the associated marker georeferenced data 52 or to correct or adjust the georeferencing of the a least a portion of the markers 16 as a post processing task before generating of the associated marker georeferenced data 52, to ensure an optimal and precise georeferencing of the a least a portion of the markers 16.

In an embodiment, the marker georeferenced data 52 including at least a subset of the markers 16 identified in the region of interest and their corresponding georeferenced position is stored in the marker data source 30. In view of the above, the data from the marker data source 30 can be used to provide a list of the markers 16 of the region of interest and their precise georeferenced position.

For example and without being limitative, in an embodiment (not shown), the list of the markers 16 of the region of interest can be used by a marker inventory system to provide an inventory of the markers 16 of the region of interest, along with the relevant data/information for the corresponding markers (marker ID, location, state of the marker, etc.). For instance, this can be used by the operator of a pipeline, a railway, a electric network, or the like, to maintain a marker inventory.

In an embodiment (not shown), the marker inventory system and/or the list of the markers of the region of interest and their precise georeferenced position can be used by the operator of the pipeline, the railway, the electric network, or the like in order to know the precise positioning of the markers 16 along a corresponding ROW and to guide manual operations where inspectors are required to visit the site of each marker 16 and perform visual inspection of the markers 16 to determine if the marker conforms with regulatory standards. For example and without being limitative, in the case of pipelines, such standards can include identification of the type of pipeline being visible (gas, liquid, etc.), emergency phone numbers being visible, etc.

The movement detection module 60 is configured to receive the marker georeferenced data 52 associated to at least one marker 16 identified based on the mapping data 24 and position data 29 acquired using the data capture subsystem 20 at different points in time and to compare the marker georeferenced data 52 of the at least one marker 16 to determine if a movement or a movement trend of the marker 16 has occurred during the different points in time (i.e. to determine if a marker 16 is moving over time). In other words, when an airborne inspection is performed, the movement detection module 60 can be used to perform comparison of the georeferenced positioning of at least portions of markers 16 with previously acquired data, in order to determine if a movement or movement trend of at least a subset of the markers 16 is detected, which could be indicative of a movement of the ground 18.

For example and without being limitative, the movement detection module 60 can be configured to receive the marker georeferenced data 52 associated to at least one marker 16 identified based on the mapping data 24 and position data 29 acquired using the data capture subsystem 20 at a first time period and at second time period subsequent to the first time period. The movement detection module 60 can therefore compare the marker georeferenced data 52 of the at least one marker 16 at the first time period with the marker georeferenced data 52 of the at least one marker at the second time period, to determine if a movement of the marker 16 has occurred between the first time period and the second time period. In an embodiment, marker georeferenced data 52 of the at least one marker 16 for additional time periods can also be provided (e.g. a third time period, a fourth time period, etc.). For example and without being limitative, the different time periods can be spaced of 1 day, 1 week, 1 month, 1 year, etc. Moreover, if more than two time periods are provided, the time difference between each one of the time periods can be different (i.e. the time periods need not be equally distributed over time).

It will be understood that different algorithms, techniques, or more generally data comparison methods or techniques can be implemented by the marker movement detection module 60, in order to compare the marker georeferenced data 52 of the at least one marker 16 at the first time period with the marker georeferenced data 52 of the at least one marker at the second time period, to determine if a movement of the marker 16 has occurred between the first time period and the second time period.

In an embodiment, the movement detection module 60 can further be configured to analyze the movement of at least two markers 16 located in the vicinity of one another, to determine if a movement trend can be detected from the movement of the markers 16 located proximate to one another. In the case where a movement trend is detected, the movement detection module 60 can be configured to characterize the movement trend and associate the movement trend with a type of ground movement. In an embodiment, the movement detection module 60 can further be configured to determine if the type of ground movement is representative of a potential geohazard.

For example and without being limitative, in an embodiment, the movement detection module 60 can include a movement trend determination model 62 performing detection and/or characterization of movement trends, from the detected movements of the at least two markers located in the vicinity of one another. In an embodiment, the movement trend determination model 62 can be a machine learning model stored on a computer-readable memory and trained using a labelled dataset comprising movement trend data and returning trend detection/characterization data 64 being used by the movement detection module 60 to identify/characterize the movement trends. One skilled in the art will understand that, in alternative embodiments, other algorithms, processes or the like could be used by the movement detection module 60 to identify and/or characterize the movement trends of the at least two markers 16 located in the vicinity of one another.

In an embodiment where the marker identification data 42 includes identification and location of the section of the post **16*a* of the marker 16 positioned at the junction of the ground surface 18*a* (which can therefore be georeferenced by the marker georeferencing module 50), the movement detection module 60 can be configured to compare the georeferenced section of the markers 16 in the marker georeferenced data 52 corresponding to the section of the post 16*a* of the marker 16 positioned at the junction of the ground surface 18*a* to detect movements or movement trends of the posts 16*a* of the marker 16**.

In an embodiment, the movement detection module 60 can further be configured to perform different potential anomaly detection based on detected movements or movement trends of the at least one marker 16 between the at least two periods of time.

In an embodiment, the movement detection module 60 can further be configured to detect if the movement of the at least one marker 16 results in the at least one marker being inoperative, e.g., the at least one marker 16 has fallen and is now laying on the ground 18 (i.e. a marker 16 was in an upright orientation at a first time period and is laying on the ground surface **18*a* at a subsequent time period), or if a maker 16 is now missing (i.e. a marker 16** was present at a first time period and is absent at a subsequent time period).

In an embodiment, the movement detection module 60 can also be configured to determine if the vegetation height of the vegetation 19 associated to the at least one marker 16 (as determined by the marker identification module 40) is above a predetermined vegetation height threshold indicative or vegetation overgrowth, i.e. the vegetation 19 should be cut or trimmed, for example and without being limitative, to avoid visual obstruction of the marker 16 by the adjacent vegetation, which can negatively impact aerial inspection thereof.

Figure 3:
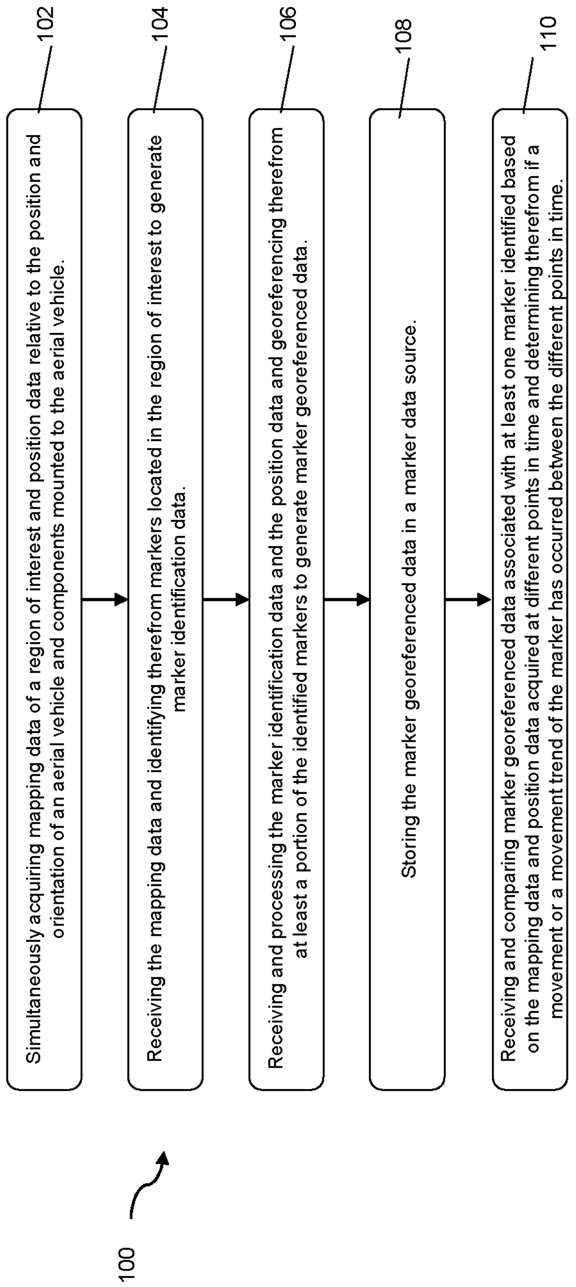
FIG. 3 is a flowchart illustrating the method for georeferencing of markers using aerial vehicle and using the georeferenced position of the markers for detecting potential movement of the ground, according to an embodiment.

Now referring to FIG. 3, a flowchart illustrating an embodiment of the steps of a computer-implemented method 100 for performing georeferencing of markers using an aerial vehicle and using the georeferenced position of the markers for detecting potential movement of the ground, using the above-described system 10, is shown. It will be understood that the steps of the method described below can include the alternatives and variations described in connection with the corresponding elements described above in the performance of these steps, even though these alternatives and variations are not repeated herein.

In the following non-limiting example, the method 100 includes an initial step 102 of simultaneously acquiring mapping data of the region of interest and position data relative to the position and orientation of the aerial vehicle and components performing the acquisition of the mapping data.

As mentioned above, the mapping data of the region of interest can include aerial images thereof, measurements of individual measurement points along the region of interest or a combination thereof. The position data can include the position, the altitude and the angular movement of the aerial vehicle (or components of the mapping capture equipment mounted thereon), during acquisition of the mapping data.

In an embodiment, the method includes the further step 104 of receiving the mapping data generated using the data capture subsystem and to identify therefrom markers located in the region of interest and generate marker identification data including data representative of the identified markers located in the region of interest.

In an embodiment, step 104 includes the substep of performing image processing using predetermined image processing algorithms, in order to identify at least a portion of the markers located in the region of interest. In an alternative embodiment, step 104 includes the substep of performing object detection from the 3D point cloud using predetermined algorithms or processes, in order to identify at least a portion of the markers located in the region, from the received mapping data.

In an embodiment, step 104 includes the substep of detecting vegetation in the vicinity of each one of the markers, from the received mapping data.

In an embodiment, step 104 includes the substep of detecting specific reference features from the mapping data of the region of interest and include the data representative of the identified reference features from the mapping data of the region of interest in the generated marker identification data.

In an embodiment, the method 100 further includes the step 106 of receiving and processing the marker identification data and the position data, to georeference at least a portion of the identified markers and generate marker georeferenced data. In an embodiment, step 106 includes the substep of associating pixels corresponding to at least a portion of a marker to a coordinate, as part of the marker georeferenced data. In an alternative embodiment, step 106 includes the substep of associating points of the point cloud corresponding to at least a portion of a marker to a coordinate, as part of the marker georeferenced data. In an embodiment, step 106 includes the substep of determining and georeferencing a summit for each one of the identified markers.

In an embodiment, the method 100 includes the further step of acquiring reference georeferenced data including known position of GPS control points associated to the specific reference features found in the mapping data, from a marker data source, and step 106 further includes correcting or adjusting the position data prior to performing georeferencing of the a least portion of the identified markers and generating the marker georeferenced data or to correct or adjust the georeferencing of the a least portion of the identified markers as a post processing step before generating the marker georeferenced data.

In an embodiment, step 106 further includes the substep of determining a height of the vegetation in the vicinity of the marker. In an embodiment, the height of the vegetation in the vicinity of each one of the detected markers is determined as a relative height with regard to the georeferenced summit of the associated marker. In an alternative embodiment, the height of the vegetation in the vicinity of each one of the detected markers is a height from the ground surface.

In an embodiment, the method 100 further includes the step 108 of storing in a marker data source the marker georeferenced data including at least a subset of the markers identified in the region of interest and their corresponding georeferenced position.

In an embodiment, the method 100 further includes the step 110 of determining if a movement or a movement trend of the marker has occurred, using the marker georeferenced data associated to at least one marker identified based on the mapping data and position data acquired at different points in time.

In an embodiment, step 110 includes the substeps of receiving the marker georeferenced data associated to at least one marker identified based on the mapping data and position data acquired at a first time period and at second time period subsequent to the first time period and comparing the marker georeferenced data of the at least one marker at the first time period with the marker georeferenced data of the at least one marker at the second time period.

In an embodiment, step 110 includes the further substep of analyzing the movement of at least two markers located in the vicinity of one another and determining if a movement trend can be detected from the movement of the markers located proximate to one another. In the case where a movement trend is detected, the method can include the further substep of characterizing the movement trend to associate the movement trend with a type of ground movement and determine if the type of ground movement is representative of a potential geohazard. In an embodiment, the substeps of analyzing the movement of at least two markers located in the vicinity of one another and/or characterizing the movement trend to associate the movement trend with a type of ground movement and determine if the type of ground movement is representative of a potential geohazard can include using a machine learning model stored on a computer-readable memory and trained using a labelled dataset comprising movement trend data and returning trend detection/characterization data to identify/characterize the movement trends.

In an embodiment, the method further includes a step determining if a vegetation height associated to at least one marker is above a vegetation height threshold indicative of overgrowth of the vegetation.

In an embodiment, the method further includes a step of detecting if the movement of the at least one marker results in the at least one marker being inoperative, e.g., if the at least one marker has fallen and is now laying on the ground or if a previously identified maker is now missing.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention could be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A system for georeferencing of markers using aerial vehicle and using the georeferenced position of the markers for detecting potential movement of the ground, the system comprising:

- a data capture subsystem mounted to an aerial vehicle, the data capture subsystem comprising mapping capture equipment acquiring mapping data representative of a region of interest as the aerial vehicle is flown over the region of interest and positioning equipment simultaneously acquiring position data relative to the position and orientation of the aerial vehicle and the mapping capture equipment;
- a marker identification module configured to receive the mapping data generated using the data capture subsystem and to identify at least portions of markers located in the region of interest, based on the received mapping data, the marker identification module generating marker identification data therefrom;
- a marker georeferencing module configured to receive and process the marker identification data and the position data and to georeference at least a portion of the identified at least portions of markers therefrom, the marker georeferencing module generating marker georeferenced data;

a marker data source receiving and storing the marker georeferenced data; and a movement detection module configured to receive the marker georeferenced data associated to at least one marker identified based on the mapping data and position data acquired at different points in time and compare the marker georeferenced data of the at least one marker at the different points in time to detect if one of a movement or a movement trend of the at least one marker has occurred.

2. The system of claim 1, wherein the mapping capture equipment includes a high-definition camera and the mapping data of the region of interest includes aerial images thereof, and wherein the marker georeferencing module is configured to associate pixels corresponding to the at least portion of the identified at least portions of markers to a coordinate, as part of the marker georeferenced data.

3. The system of claim 1, wherein the mapping capture equipment further includes 3D remote scanning equipment and the mapping data of the region of interest further includes a point cloud of measurements of individual measurement points along the region of interest, with the marker georeferencing module being configured to associate points of the point cloud corresponding to the at least portion of the identified at least portions of markers to a coordinate, as part of the marker georeferenced data.

4. The system of claim 1, wherein the marker identification module is further configured to identify specific reference features located in the region of interest based on the received mapping data, and include the data relative to the identification of the specific reference features in the generated marker identification data, and wherein the marker georeferencing module is configured to acquire reference georeferenced data including GPS control points associated to the specific reference features having known GPS position and to either correct or adjust the position data prior to performing georeferencing of the at least portion of the identified at least portions of the markers or to correct or adjust the georeferencing of the a least portion of the identified at least portions of the markers as a post processing step before generating the marker georeferenced data.

5. The system of claim 1, wherein the positioning equipment includes a high precision global navigation satellite system receiver, an altimeter and an inertial measurement unit.

6. The system of claim 1, wherein the region of interest is one of a pipeline right-of-way, a power line right-of-way, a railway right-of-way, and a coastal road.

7. The system of claim 1, wherein the marker identification module is configured to identify at least portions of at least one of signs mounted on support posts planted into a ground, posts to which the signs are mounted, and a section of the posts positioned at a junction of a ground surface as the at least portions of markers located in the region of interest.

8. The system of claim 1, wherein the movement detection module is further configured to analyze the movement of at least two markers located in the vicinity of one another and to determine if a movement trend can be detected from the movement of the markers located proximate to one another and to characterize the movement trend to associate the movement trend with a type of ground movement and determine if the type of ground movement is representative of a potential geohazard.

9. The system of claim 1, wherein the movement detection module is further configured to detect if the movement of the at least one marker results in the at least one marker being inoperative.

10. The system of claim 1, wherein the marker georeferencing module is configured to determine and georeference a summit for each one of the identified markers.

11. The system of claim 10, wherein the marker identification module is further configured to detect vegetation in the vicinity of the at least one marker identified based on the mapping data, the marker georeferencing module is configured to determine a relative height of the vegetation in the vicinity of the at least one marker relative to the summit of the at least one marker and the movement detection module is further configured to determine if the relative height of the vegetation is above a vegetation height threshold indicative of overgrowth of the vegetation.

12. A method for georeferencing of markers using aerial vehicle and using the georeferenced position of the markers for detecting potential movement of the ground, the method comprising the steps of:

simultaneously acquiring mapping data of a region of interest and position data relative to the position and orientation of an aerial vehicle and components mounted to the aerial vehicle for performing the acquisition of the mapping data, as the aerial vehicle is flown over the region of interest;

receiving the mapping data and identifying therefrom markers located in the region of interest to generate marker identification data;

receiving and processing the marker identification data and the position data and georeferencing therefrom at least a portion of the identified markers to generate marker georeferenced data;

storing the marker georeferenced data in a marker data source; and receiving and comparing marker georeferenced data associated with at least one marker identified based on the mapping data and position data acquired at different points in time and determining therefrom if a movement or a movement trend of the marker has occurred between the different points in time.

13. The method of claim 12, wherein the step of receiving the mapping data and identifying therefrom markers located in the region of interest comprises performing image processing using predetermined image processing algorithms, in order to identify at least a portion of the markers located in the region of interest, and the step of receiving and processing the marker identification data and the position data and georeferencing therefrom at least a portion of the identified marker comprises associating pixels corresponding to at least a portion of a marker to a coordinate as part of the marker georeferenced data.

14. The method of claim 12, wherein the step of receiving the mapping data and identifying therefrom markers located in the region of interest comprises performing object detection from a point cloud using predetermined algorithms or processes, in order to identify at least a portion of the markers located in the region of interest and wherein the step of receiving and processing the marker identification data and the position data and georeferencing therefrom at least a portion of the identified marker includes associating points of the point cloud corresponding to at least a portion of a marker to a coordinate as part of the marker georeferenced data.

15. The method of claim 12, wherein the step of receiving the mapping data and identifying therefrom markers located in the region of interest further comprises detecting specific reference features from the mapping data of the region of interest and including the data representative of the identified reference features from the mapping data of the region of interest in the generated marker identification data.

16. The method of claim 15, further comprising acquiring reference georeferenced data including known position of GPS control points associated to the specific reference features found in the mapping data, from the marker data source, and wherein the step of receiving and processing the marker identification data and the position data and georeferencing therefrom at least a portion of the identified markers to generate marker georeferenced data further includes correcting or adjusting the position data prior to performing georeferencing of the a least portion of the identified markers and generating the marker georeferenced data or to correct or adjust the georeferencing of the a least portion of the identified markers as a post processing step before generating the marker georeferenced data.

17. The method of claim 12, wherein the step of receiving the marker georeferenced data associated to at least one marker identified based on the mapping data and position data acquired at a first time period and at second time period subsequent to the first time period and comparing the marker georeferenced data of the at least one marker at the first time period with the marker georeferenced data of the at least one marker at the second time period comprises analyzing the movement of at least two markers located in the vicinity of one another, determining therefrom if a movement trend can be detected from the movement of the markers located proximate to one another, characterizing the movement trend to associate the movement trend with a type of ground movement, and determining if the type of ground movement is representative of a potential geohazard.

18. The method of claim 12, wherein the step of receiving the marker georeferenced data associated to at least one marker identified based on the mapping data and position data acquired at a first time period and at second time period subsequent to the first time period and comparing the marker georeferenced data of the at least one marker at the first time period with the marker georeferenced data of the at least one marker at the second time period comprises detecting if the movement of the at least one marker results in the at least one marker being inoperative.

19. The method of claim 12, wherein the step of receiving and processing the marker identification data and the position data and georeferencing therefrom at least a portion of the identified markers to generate marker georeferenced data comprises a substep of determining and georeferencing a summit for each one of the identified markers.

20. The method of claim 19, further comprising detecting vegetation in the vicinity of the at least one marker identified based on the mapping data, determining a relative height of the vegetation in the vicinity of the at least one marker relative to the summit of the at least one marker, and determining if the relative height of the vegetation is above a vegetation height threshold indicative of overgrowth of the vegetation.

* * * * *